May 20, 1930.　　　　T. A. JACKSON　　　　1,759,196
DRILL GRINDER
Filed Dec. 13, 1928　　　2 Sheets-Sheet 1
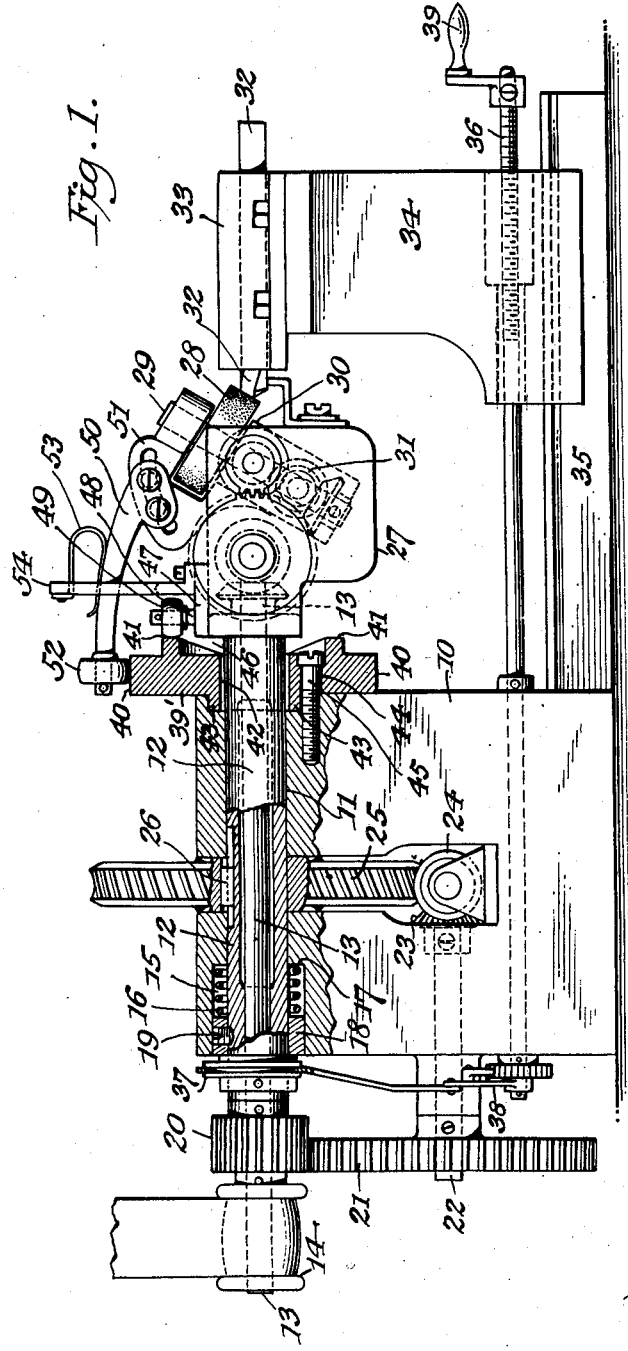
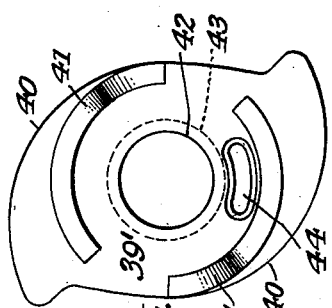
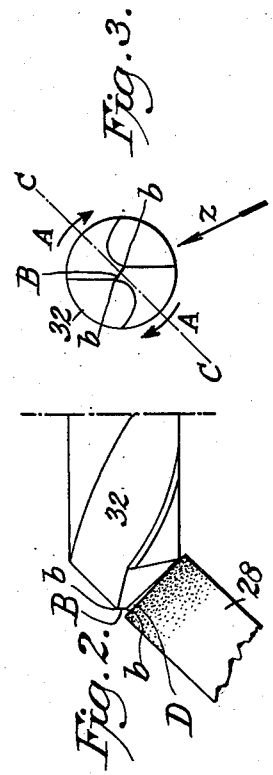
Inventor
Thaddeus A. Jackson,
By A. R. Appleman,
His Attorney.

May 20, 1930.  T. A. JACKSON  1,759,196
DRILL GRINDER
Filed Dec. 13, 1928   2 Sheets-Sheet 2

Inventor,
Thaddeus A. Jackson,
By A. R. Appleman
Attorney.

Patented May 20, 1930

1,759,196

UNITED STATES PATENT OFFICE

THADDEUS A. JACKSON, OF BROOKLYN, NEW YORK

DRILL GRINDER

Application filed December 13, 1928. Serial No. 325,780.

This invention relates to drill grinders and is an improvement on the machine for grinding drills shown and described in a patent issued to me on December 13, 1927, No. 1,652,672, "drill grinders."

A machine built according to the above patent has been exhaustively tested and while its operation has been satisfactory, it was found that better results were obtained by the provision of a two-face cam and means operated thereby whereby the grinder may be reciprocated in a horizontal plane at two different points in its bodily travel around the drill head thereby permitting the grinder wheel to be slightly tilted but in contact with the outer edge of a drill lip to cause the inward grinding face of the wheel to be raised or drawn away from the end of the short cross ridge or point at the peak of the drill lips as it passes, to prevent cutting or rounding the ends of said ridge or point.

In carrying out my invention I preferably employ a fixed cam adjustably secured to a stationary head stock having bearings in which high and low speed shafts are journalled. The shafts pass through the fixed cam centrally thereof and carry a revoluble head on which a rotary grinder wheel is carried by a rocker block controlled through an arm and roller by the contour of the edge of the said cam, said grinder being driven through a gear train by the high speed shaft.

Yielding means are provided to operate in connection with one of said shafts, whereby a roller, on a pin fixed to said head, may be urged into constant contact with a circular face cam formed with the rocker block operating cam.

The above mentioned rollers operating over the edge and face surfaces of the said cam are arranged in radial alignment to better time the movements of the parts.

I will now proceed to describe the invention in detail where I shall outline in full that form of the invention which I have selected for illustration in the accompanying drawings, but it will be understood, the arrangement of the parts may be varied considerably in the commercial application of the device provided for the purpose set forth.

In the drawings:—

Fig. 1 is a side view partly in section of a drill grinder showing my improvements thereon.

Fig. 2 is a diagrammatic detail showing the point of a twist drill and a portion of a grinder wheel and disclosing the approximate angularity of relief or clearance of the grinding face of the wheel when passing an end of the cutting peak ridge dividing the drill lips, the angle of the view of the drill being in line with the arrow Z in Fig. 3.

Fig. 3 is a diagrammatic view of the point or cutting end of a drill showing by a broken line about where the angularity of separation of the grinder and drill lip should begin.

Fig. 4 is a view of a two face cam now employed.

Figure 5:
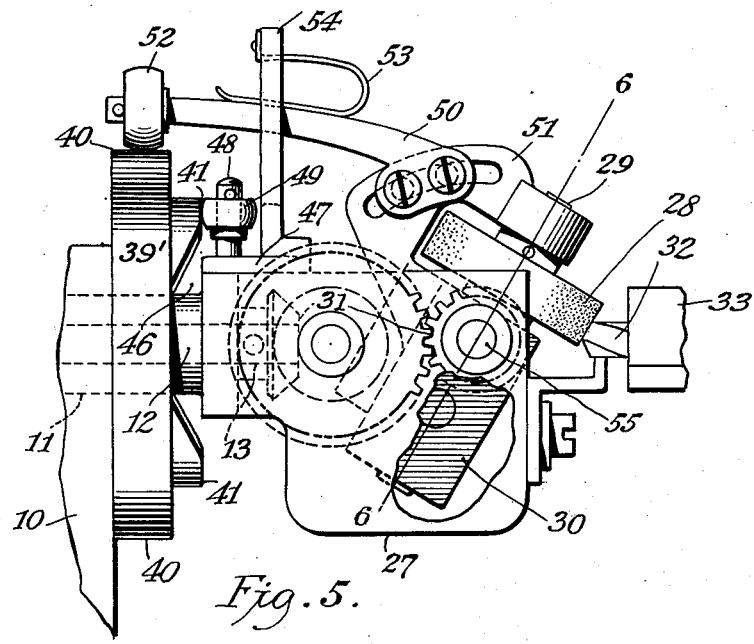
Fig. 5 is an enlarged side elevation of the head of the machine, partly broken away.

Referring to the drawings, a stationary head-stock or support is shown at 10, constituting the main frame or support for the parts. This stationary head-stock is formed with a bore or bearing 11, in which a low speed sleeve shaft 12 is journalled. A high speed shaft 13, is revoluble within and centrally of the sleeve shaft and is driven directly through a pulley or gear 14, from a suitable source of power.

The rear wall of the stationary head stock 10 may be counterbored to provide a chamber 15, in which a spring 16, may be confined between a shoulder 17, and a collar 18, fixed to the said slow speed shaft by a set screw 19.

Keyed to the high speed shaft 13, inward of the driving element 14, is a gear pinion 20, serving to drive a gear wheel 21, mounted on a horizontal drive shaft 22, through which by suitable gearing 23, and a worm 24, a worm wheel 25 is driven.

This worm wheel is interlocked to the sleeve or low speed shaft 12 by a key or feather 26, entering grooves in the said wheel and sleeve shaft in slidable relation to permit of longitudinal movement of said shaft relative to said worm wheel.

At the forward end of the slow turning sleeve shaft 12, a head 27 is fixedly carried. This head corresponds in general construction to the corresponding head or yoke 51 of the patent above referred to and revolves with the movement of the sleeve shaft 12.

A grinding wheel 28, is mounted to rotate at high speed on a shaft 29, extending through a rocker block 30, said shaft being driven by a suitable gear train or driving connection 31 from the high speed shaft 13 as indicated by dotted lines in Fig. 1.

A drill 32, is shown held in a chuck 33 or other support, mounted on a block 34, slidable on shears or other supports 35 through the instrumentality of a feed screw 36, driven by an eccentric 37, through link, pawl and ratchet connections 38 at the rear of the machine. The eccentric is mounted on and rotates with the slow moving sleeve shaft 12.

A manually operated handle 39, may be employed to turn the feed screw to return the drill holder to the normal starting position after lifting a pawl from a ratchet in the drill feeding group 38, as will be obvious.

In carrying out my invention I supply a cam 39'; (best shown in Fig. 4), having a peripheral or side cam surface 40, and concentric face cam surfaces 41. This cam has a central bore 42, a surrounding sleeve boss 43, and a concentric slot 44, through which an adjusting screw 45, extends into the stationary head stock 10 to permit of concentric adjustment of said cam.

Normally there is a space between the rear shoulder of the head 27 and the face of the cam 39', to allow the reciprocatory movement of the head 27, the shafts 12 and 13 and associated parts as shown at 46.

Secured to the head at one side thereof is a plate 47, from which a pin, 48, projects and on which a roller 49 may rotate.

This roller is urged into constant engagement with the face cams 41, by the spring 16, at the back of the machine, thus controlling in one direction the longitudinal movements of the grinder wheel relative to the drill in the operation of grinding the same.

The movement of the rocker block 30, is controlled by an arm 50, adjustably connected to a slotted web portion 51 of said block, through a roller 52, revolubly mounted on the end of said arm and which is urged into contact with the peripheral face 40 of the cam 39', by a spring 53, held by a yoke 54, supported on the plate 47, of the head 27.

In the operation of grinding a drill with a rotary grinding wheel, when said wheel is given a bodily planetary movement in a concentric path around said drill, in the direction of the arrows A in Fig. 3, it has been found by intensive experiment that to achieve best results it is necessary to have the grinder relieved by a rearward movement thereof to permit of a slight rocking condition at about the line C—C as the grinder reaches opposite sides of the drill to provide a clearance as at D, Fig. 2, so that the extreme ends b—b of the peak ridge B of the drill will not be cut away or rounded.

Figure 6:
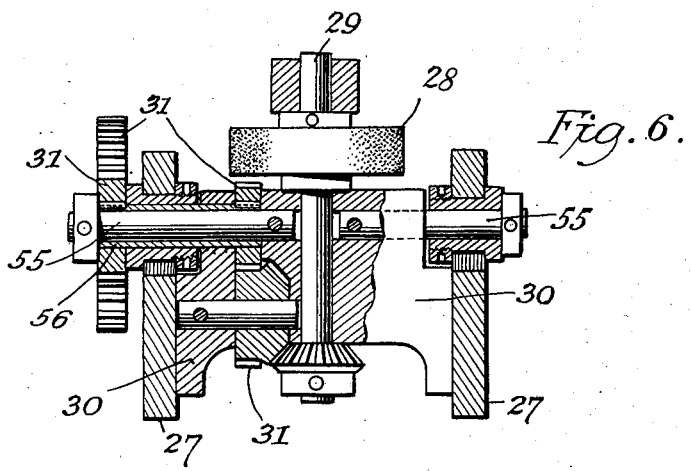
Fig. 6 is a partial sectional elevation of the head, taken about on the line 6—6 of Fig. 5, showing how the rocker block is journalled to oscillate.

As shown in Fig. 6 of the drawings, the rocker block 30, may swing or oscillate on appropriate aligned shafts 55, mounted in the sides of the head 27 as shown. A sleeve 56, on one of said aligned shafts, connects two gears of the train 31, to transmit the driving power toward the center of said block.

Having thus described my invention I claim:—

1. In a drill grinder having a drill holder, and means for feeding the same, a stationary head-stock, drive shafts longitudinally slidable therein, a revoluble support, a grinder mounted to oscillate thereon toward and away from the drill center, means for rotating said support to carry the grinder bodily around the center of the drill and means for reciprocating said drive shafts and support and grinder relative to said stationary head-stock in a longitudinal plane toward and away from said drill for the purpose set forth.

2. In a drill grinder having a drill holder, and means for feeding the same, a stationary head-stock, drive shafts longitudinally slidable thereon, a revoluble support, a grinder mounted to oscillate thereon toward and away from the drill center, means for rotating said support to carry the grinder bodily around the center of the drill and means for reciprocating said drive shafts and support and grinder relative to said stationary head-stock in a longitudinal plane toward and away from said drill for the purpose set forth, said reciprocating means comprising a face cam and a roller bearing thereon, said roller being carried on said support.

3. A drill grinder including a rotary grinder disk, a stationary head-stock, a support to present a drill to said disk and hold it in fixed axial relation thereto, said disk having intermittent oscillatory movements toward and away from the drill center, bodily planetary movement around said drill, horizontal reciprocatory movement relative to said stationary head-stock and toward and away from the drill lips, means for imparting the described motions to the disk, and means for feeding the drill.

4. In a drill grinder having a drill support and means for feeding the same, a stationary head-stock, a revoluble head, a grinder mounted to oscillate thereon, means for turning said head to carry the grinder around the drill, means for horizontally reciprocating the head and grinder relative to said stationary head-stock and toward and way from the drill and means for causing said grinder to operate on all lips of the drill at each turn of said head.

5. A drill grinder including a drill support and means for feeding the same, a stationary head-stock, a revoluble support for a grinder to carry the same bodily around the drill, means for oscillating the grinder relative to the drill center, means for moving said grinder in a horizontal plane relative to said stationary head-stock and toward and away from the drill lips and means for driving said grinder.

Signed at borough of Brooklyn, in the county of Kings, city and State of New York, this 5th day of December, A. D. 1928.

THADDEUS A. JACKSON.